United States Patent
Baun et al.

(10) Patent No.: US 11,415,106 B2
(45) Date of Patent: Aug. 16, 2022

(54) RETROFITTED WIND TURBINE INSTALLATION AND A METHOD OF RETROFITTING A WIND TURBINE INSTALLATION WITH A REPLACEMENT WIND TURBINE

(71) Applicant: Vestas Wind Systems A/S, Aarhus N. (DK)

(72) Inventors: Torben Ladegaard Baun, Skødstrup (DK); Jesper Lykkegaard Neubauer, Hornslet (DK); Tue Hald, Hadsten (DK)

(73) Assignee: Vestas Wind Systems A/S, Aarhus N (DK)

( * ) Notice: Subject to any disclaimer, the term of this patent is extended or adjusted under 35 U.S.C. 154(b) by 103 days.

(21) Appl. No.: 16/963,350

(22) PCT Filed: Jan. 21, 2019

(86) PCT No.: PCT/DK2019/050022
§ 371 (c)(1),
(2) Date: Jul. 20, 2020

(87) PCT Pub. No.: WO2019/154469
PCT Pub. Date: Aug. 15, 2019

(65) Prior Publication Data
US 2021/0363972 A1    Nov. 25, 2021

(30) Foreign Application Priority Data
Feb. 7, 2018   (DK) .......................... PA 2018 70077

(51) Int. Cl.
*F03D 13/10*   (2016.01)
*F03D 13/20*   (2016.01)
(Continued)

(52) U.S. Cl.
CPC ............. *F03D 13/10* (2016.05); *E04H 12/20* (2013.01); *E04H 12/348* (2013.01); *F03D 13/20* (2016.05);
(Continued)

(58) Field of Classification Search
CPC .......... F03D 11/04; F03D 13/20; F03D 13/10; E04H 12/34; E04H 12/20; E04H 12/342;
(Continued)

(56) References Cited

U.S. PATENT DOCUMENTS 5,419,683 A * 5/1995 Peace ........................ F03D 9/34
416/DIG. 4
6,157,088 A * 12/2000 Bendix ..................... F03D 9/34
290/55

(Continued)

FOREIGN PATENT DOCUMENTS

DE    102011010417 A1    8/2012
EP        1316656 A1       6/2003
(Continued)

OTHER PUBLICATIONS

Danish Patent and Trademark Office, Search and Examination Report in PA 2018 70077, dated Jul. 25, 2018.
(Continued)

*Primary Examiner* — Andrew J Triggs
(74) *Attorney, Agent, or Firm* — Wood Herron & Evans LLP

(57) ABSTRACT

A retrofitted wind turbine installation for replacing a prior wind turbine installation includes the foundation of the prior wind turbine installation and a replacement wind turbine supported by the foundation, wherein the tower of the retrofitted wind turbine installation is a cable-stayed tower to reduce the bending loads imposed on the foundation. A method of retrofitting an existing wind turbine installation
(Continued)

with a replacement wind turbine includes disassembling at least a portion of the existing wind turbine, assembling a replacement tower to a remaining portion of the existing wind turbine installation, attaching a plurality of stay cables between the tower of the retrofitted wind turbine installation and stay cable foundations, and attaching the replacement energy generating unit to the replacement tower.

20 Claims, 11 Drawing Sheets

(51) Int. Cl.
*E04H 12/20* (2006.01)
*E04H 12/34* (2006.01)

(52) U.S. Cl.
CPC ..... *F05B 2230/80* (2013.01); *F05B 2240/912* (2013.01); *F05B 2240/917* (2013.01)

(58) Field of Classification Search
CPC ............... E04H 12/348; F05B 2230/80; F05B 2240/912; F05B 2240/917; Y02E 10/728
See application file for complete search history.

(56) References Cited

U.S. PATENT DOCUMENTS

| | | | | |
|---|---|---|---|---|
| 9,416,555 | B2 * | 8/2016 | De Abreu | ............... E04H 12/20 |
| 10,676,952 | B2 * | 6/2020 | Fang | ..................... E04H 12/085 |
| 2016/0215762 | A1 * | 7/2016 | Rohden | ................... F03D 13/10 |
| 2016/0258421 | A1 | 9/2016 | Agassi | |

FOREIGN PATENT DOCUMENTS

| | | |
|---|---|---|
| EP | 2846041 A1 | 3/2015 |
| EP | 3165680 A1 | 5/2017 |
| JP | 2009068407 A | 4/2009 |
| JP | 2010275705 A | 12/2010 |
| KR | 101685854 B1 | 12/2016 |

OTHER PUBLICATIONS

European Patent Office, International Search Report and Written Opinion in PCT Application No. PCT/DK2019/050022, dated Mar. 26, 2019.

G.F. Bakema et al., "Re-powering of wind farms in practice" In: "European Wind Energy Conference and Exhibition 2006, EWEC 2006", Jan. 1, 2006 (Jan. 1, 2006), XP055097838, ISBN: 978-1-62-276467-9 vol. 1, pp. 29-35.

* cited by examiner

RETROFITTED WIND TURBINE INSTALLATION AND A METHOD OF RETROFITTING A WIND TURBINE INSTALLATION WITH A REPLACEMENT WIND TURBINE

TECHNICAL FIELD

The invention relates generally to wind turbines, and more particularly to a retrofitted wind turbine installation that replaces aspects of an existing wind turbine installation, and to a method of retrofitting a wind turbine installation with a replacement wind turbine, which is typically larger and having greater energy generating capability than the prior wind turbine.

BACKGROUND

Wind turbines are used to produce electrical energy using a renewable resource and without combusting a fossil fuel. Generally, a wind turbine converts kinetic energy from the wind into electrical power. A conventional horizontal-axis wind turbine installation includes a foundation, a tower supported by the foundation, and an energy generating unit positioned atop of the tower. The energy generating unit typically includes a nacelle to house a number of mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with a large number of wind turbine installations being located both on land and offshore.

Wind turbines are large electromechanical machines, and therefore are subject to wear and fatigue that diminishes the structural integrity of the wind turbine installation over time during operation of the wind turbine. Accordingly, wind turbine installations typically have an overall life expectancy design value. By way of example, current wind turbine installations typically have a life expectancy design value of about twenty years, and wind turbines built ten to fifteen years ago may have an even lower life expectancy design value. Thus, there currently are a large number of wind turbine installations that are reaching the end of their useful life, and the number of wind turbines reaching the end of their useful life is expected to grow in the coming years.

Existing wind turbine installations that were commissioned some ten, fifteen, or twenty years ago are typically located at wind turbine installation sites that have excellent and optimal wind conditions for producing wind-generated power. In other words, many of the best sites in the world for generating wind power already have wind turbines installed on those sites. Thus, as the existing wind turbine installations reach the end of their useful life, wind turbine operators typically want to replace the original or existing wind turbine installations with a second replacement wind turbine installation at the same site. Moreover, advances in wind turbine technology has significantly increased over the last twenty years, such that modern wind turbines are significantly larger with significantly larger tower heights, longer wind turbine blades, and larger, more-efficient generators for producing significantly more wind-generated power. The difference in size between the existing wind turbine installation and the modern replacement wind turbine installation generally requires a total rebuild of the wind turbine installation site.

To this end, wind turbine operators or manufacturers will first transport a large crane to the existing wind turbine installation site to disassemble the existing wind turbine down to its foundation. These large cranes are very expensive to transport and operate, thus it is desirable to optimize the use of the crane in order minimize costs. Next, the existing foundation is removed, and the foundation site excavated in preparation for a new, typically larger, stronger foundation designed for the more modern replacement wind turbine. The new foundation may then be installed at the installation site. The process of installing a new foundation is time consuming and may take up to a few months to allow the foundation to cure and settle. As it would be prohibitively expensive to keep the large crane at the wind turbine installation site during these months, typically after the existing wind turbine is disassembled, the large crane is sent back to its original location or to other wind turbine installation sites.

However, after the foundation has cured and is ready to receive the replacement wind turbine thereon, the large crane is transported back to the wind turbine installation site. Additionally, the replacement wind turbine (e.g., tower sections, nacelle, blades, etc.) may also be transported to the wind turbine installation site at this time. Next, the large crane is used to assemble the replacement wind turbine on the new foundation, after which the crane may depart the wind turbine installation site. After suitable testing and the like, the replacement wind turbine may be placed back into operation.

As is evident from the above, this process of replacing an existing wind turbine installation that has reached the end of its useful life with a newer, more modern wind turbine installation takes a significant amount of time and is associated with significant costs. Additionally, the logistics of the process, i.e., scheduling of the crane and transport of the crane and wind turbine components to and from the wind turbine installation site may also prove difficult and costly. Accordingly, wind turbine manufacturers and operators are seeking options for decreasing the time and costs associated with wind turbine replacement at existing wind turbine installation sites. More particularly, wind turbine manufacturers and operators are seeking wind turbine designs and methodologies that allow wind-generated power to continue to be produced at pristine sites around the world that have old and outdated wind turbines in a timely and cost-effective manner.

SUMMARY

To these and other ends, aspects of the invention are directed to a retrofitted wind turbine installation for replacing a prior wind turbine installation, wherein the prior wind turbine installation includes a foundation and a wind turbine supported on the foundation. The retrofitted wind turbine installation includes the foundation of the prior wind turbine installation, and a replacement wind turbine supported by the foundation, wherein the replacement wind turbine includes a replacement tower and a replacement energy generating unit. The tower of the retrofitted wind turbine installation is configured as a cable-stayed tower having a plurality of stay cables (e.g., three or more) connected at one end to the tower at a cable mounting position, and at the other end to stay cable foundations. The stay cables are configured to reduce the bending loads being transferred to the foundation, and thereby extend the operating life of the foundation. Preferably, the operating life of the foundation is extended to generally coincide with the operating life of the replacement wind turbine.

In one embodiment, the replacement tower is coupled to the foundation such that the foundation is the only portion of the prior wind turbine installation reused for the retrofitted wind turbine installation. In another embodiment, however, the retrofitted wind turbine installation not only includes the foundation of the prior wind turbine installation, but further includes a portion of the tower of the prior wind turbine installation coupled to the foundation. In this embodiment, a replacement tower is coupled to the portion of the tower from the prior wind turbine installation. In this case, the stay cables are configured to also reduce the bending loads being transformed to the reused tower portion of the prior wind turbine installation, and thereby extend its operating life. Preferably, the operating life of the reused tower portion of the prior wind turbine installation is extended to generally coincide with the operating life of the replacement wind turbine. In one embodiment, the prior wind turbine was formed by a tower having a plurality of tower sections, and the interface between the replacement tower and the portion of the tower from the prior wind turbine installation occurs at an end of a tower section of the prior tower. In one embodiment, the stay cables alter the bending moment in the tower such that the portion of the tower from the prior wind turbine installation includes a location along its height having no bending moment. The bending moment may also change directions in such an embodiment.

According to the invention, the tower in the retrofitted wind turbine installation has a height that is greater than the height of the tower in the prior wind turbine installation. Additionally, the replacement energy generating unit in the retrofitted wind turbine installation has a greater energy-generating capacity than the energy generating unit in the prior wind turbine installation. In other words, preferably the replacement wind turbine is larger and more powerful than the wind turbine in the prior installation. The prior foundation, however, may be used with the larger, more powerful wind turbine due to the use of the cable-stayed tower. In this regard, the bending loads imposed on the foundation from operation of the replacement wind turbine would normally exceed the capacity of the foundation in absence of the at least one cable stay. Thus, inclusion of the stay cables reduces the bending loads on the foundation and any remaining tower portions of the prior wind turbine installation such that these elements may be reused in the retrofitted wind turbine installation.

In one embodiment, the replacement tower includes a lower transition section forming part of the replacement tower below the cable mounting position and an upper transition section forming part of the replacement tower. The diameter of the lower transition section increases in an upward direction and the diameter of the upper transition section decreases in an upwards direction. The replacement tower may further include a cable mounting section arranged between the lower transition section and the upper transition section, wherein the cable mounting section includes the cable mounting position. In this embodiment, the replacement tower has a first tower diameter at the cable mounting position and the first tower diameter defines a maximum diameter of the tower of the retrofitted wind turbine installation (i.e., the replacement tower or the portion of the prior tower and replacement tower in combination). In an alternative embodiment, instead of increasing the strength of the tower at the cable mounting position by an increase in the tower diameter, the strength of the tower at or in the vicinity of the cable mounting position may be strengthened by a local increase in the wall thickness of the tower. Moreover, in an exemplary embodiment, the cable mounting position may be located on the replacement tower of the retrofitted wind turbine installation. In an alternative embodiment, however, the cable mounting position may be located on the portion of the tower from the prior wind turbine installation. In this case, mounting elements may be secured to the reused tower portion for attaching the stay cables.

A method of retrofitting an existing wind turbine installation with a replacement wind turbine to form a retrofitted wind turbine installation is disclosed. The existing wind turbine installation includes a foundation and a wind turbine having a tower and an energy generating unit. The method includes disassembling at least a portion of the existing wind turbine and assembling a replacement tower to a remaining portion of the existing wind turbine installation, wherein the tower of the retrofitted wind turbine installation is a cable-stayed tower. In this regard, the method further includes attaching a plurality of stay cables between the tower of the retrofitted wind turbine installation and corresponding cable foundations, and tensioning the stay cables, wherein the stay cables reduce the bending loads being transferred to the foundation, and attaching a replacement energy generating unit to the replacement tower.

In one embodiment, disassembling at least a portion of the existing wind turbine further includes disassembling the energy generating unit and the tower of the existing wind turbine installation, thereby substantially leaving just the foundation to be reused with the retrofitted wind turbine installation. Additionally, assembling the replacement tower further includes coupling the replacement tower to the foundation of the existing wind turbine installation. In another embodiment, disassembling at least a portion of the existing wind turbine includes disassembling a portion of the tower of the existing wind turbine installation, thereby leaving the foundation and a remaining portion of the tower of the existing wind turbine installation to be reused with the retrofitted wind turbine installation. In one embodiment, the tower of the existing wind turbine installation includes a plurality of tower sections and disassembling at least a portion of the tower further comprises disassembling one or more tower section of the tower of the existing wind turbine installation. Additionally, assembling the replacement tower further comprises coupling the replacement tower to the remaining portion of the tower of the existing wind turbine installation.

In order to determine how much of the tower of the existing wind turbine installation may be reused in the retrofitted wind turbine installation, the method may further include inspecting and/or testing the existing wind turbine tower. Furthermore, the method may include varying at least one physical parameter of the retrofitted wind turbine installation to optimize the amount of the existing tower reused in the retrofitted wind turbine installation while maintaining the maximum bending moment in the remaining portion of the tower below a predetermined limit. For example, varying at least one physical parameter may include varying at least one of: i) a height of the cable mounting position(s) of the stay cables to the tower; ii) the diameter of the stay cables; iii) an angle the stay cables make relative to ground; iv) the distance between the stay cable foundations and the tower; and v) the properties of the stay cables. In accordance with one embodiment, the stay cable foundations may be formed prior to disassembly of the existing wind turbine. Preferably, the stay cable foundations are formed prior to the existing wind turbine installation ceasing operation. Thus, the formation of the stay cable foundations does not take time during the replacement process.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
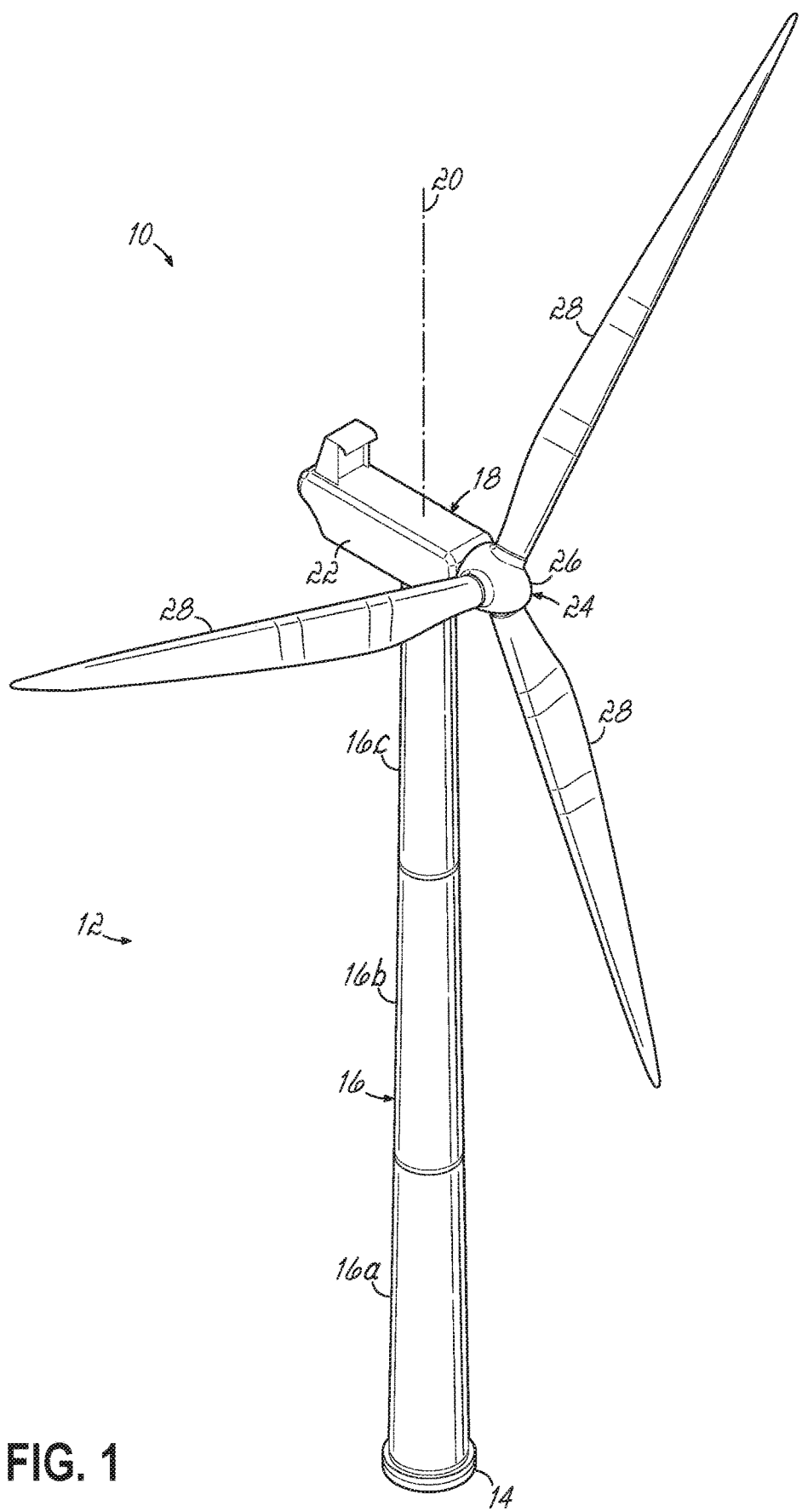
FIG. 1 is a perspective view of an existing wind turbine installation including a wind turbine supported on a foundation.

With reference to FIG. 1, an existing wind turbine installation 10 is illustrated and includes a wind turbine 12 supported on a foundation 14. The wind turbine 12 includes a tower 16 and an energy generating unit 18 disposed at the apex of the tower 16. As is conventional, the tower 16 may be coupled to the foundation 14 at a lower end thereof and defines a generally vertical tower axis 20 about which the energy generating unit 18 may rotate via a yaw mechanism (not shown). The foundation 14 may be a relatively large mass, e.g., concrete, steel, etc. embedded in the ground and through which forces on the wind turbine tower 16 and energy generating unit 18 may be ultimately transferred. The energy generating unit 18 includes the part of the wind turbine which actually transforms the energy of the wind into electrical energy. In this regard, the energy generating unit 18 typically includes a housing or nacelle 22, a rotor 24 having a central hub 26 and one or more blades 28 (e.g., three blades) mounted to the hub 26 and extending radially therefrom, and a generator (not shown) for converting mechanical energy into electrical energy.

The energy generating unit 18 may further include a drive train (not shown), including a gear arrangement, interconnecting the rotor 24 and the generator. The generator and a substantial portion of the drive train may be positioned inside of the nacelle 22 of the wind turbine 12. In addition to the generator, the nacelle 22 typically houses miscellaneous components required for converting wind energy into electrical energy and various components needed to operate, control, and optimize the performance of the wind turbine 12. The wind turbine blades 28 are configured to interact with a free stream air flow (the wind) to produce lift that causes the rotor 24 to spin or rotate generally within a plane defined by the wind turbine blades 28. Thus, the energy generating unit 18 is able to generate power from the airflow that passes through the swept area of the rotor 24. The tower 16 supports the load presented by the energy generating unit 18 and also operates to elevate the energy generating unit 18, and especially the rotor 24, to a height above ground level or sea level at which faster moving air currents of lower turbulence are typically found.

As noted above, wind turbines have a finite life expectancy value and many wind turbine installations are currently reaching the end of their useful life. Aspects of the present invention address many of the drawbacks of current wind turbine replacement processes so as to make the replacement process time and cost effective. This is primarily achieved by reusing portions of the existing wind turbine installation in the retrofitted wind turbine installation. For example, in one exemplary embodiment, the existing foundation may be reused in the retrofitted wind turbine installation. From a timing and cost perspective, the ability to reuse the existing foundation provides a number of advantages. In this regard, the largest contributor to time delay in the conventional replacement process is in the removal of the existing foundation and the installation of the new foundation. As noted above, these steps may take on the order of a few months (e.g., 2-3 months). By reusing the existing foundation, this time delay may be avoided. However, the reuse of the existing foundation (and possibly a portion of the existing tower, discussed below), requires some design considerations for the retrofitted wind turbine installation.

Figure 2:
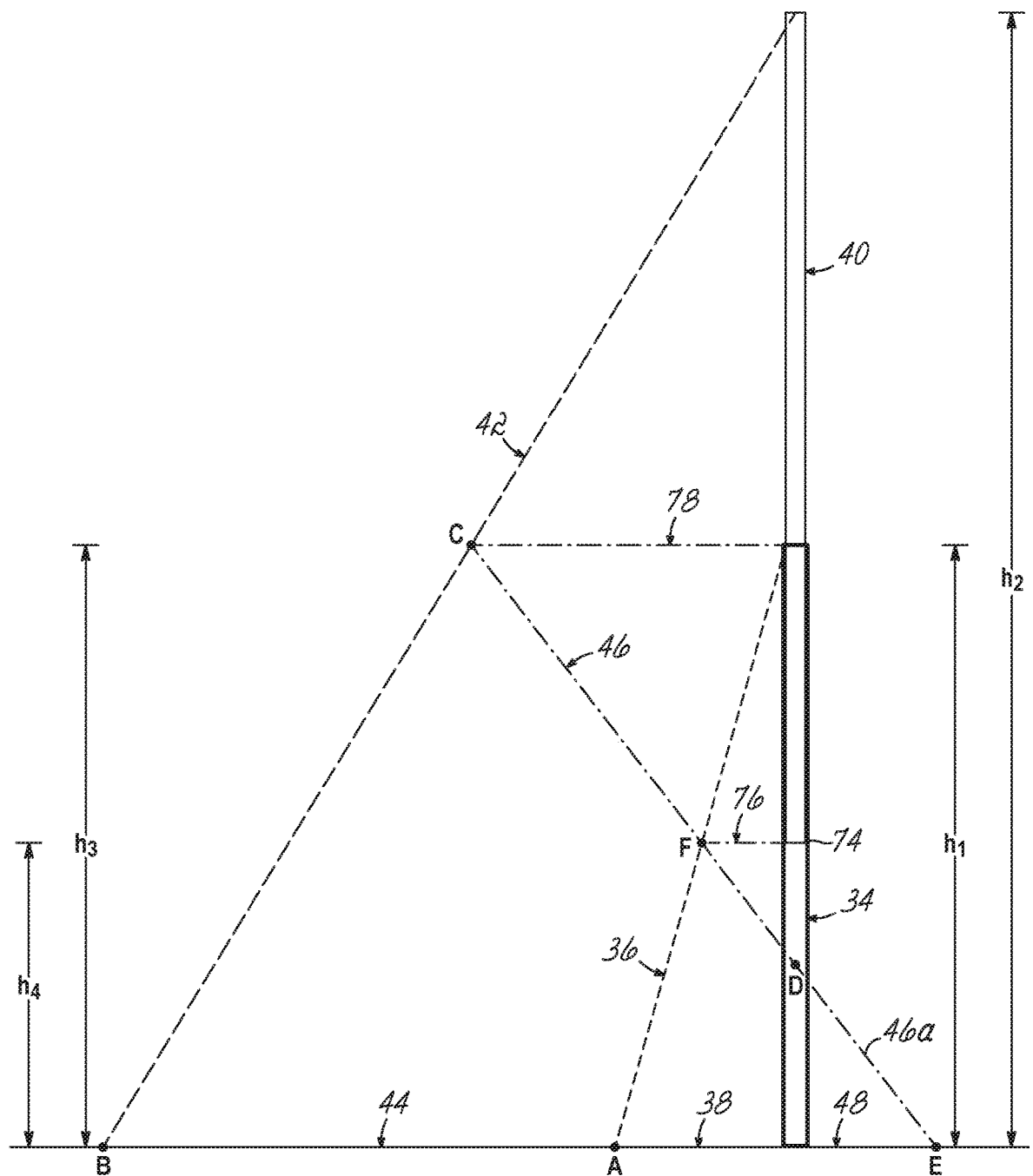
FIG. 2 is a schematic diagram illustrating the conceptual aspects of the present invention.

FIG. 2 is a schematic that illustrates many of the concepts of the present invention, and the justification for a new foundation can be readily understood in the normal course of a replacement process. In this regard, the existing tower 16 of the wind turbine installation 10 is represented by vertical line 34 in FIG. 2 and has a height of $h_1$ corresponding to the height of the existing tower 16. Operation of the energy generating unit 18 on the top of tower 16 imposes a number of stresses on the tower 16, the most prevalent of which is from a bending moment imposed along the length of the tower 16 and having a maximum bending moment occurring at the lower end of the tower 16 due to the cantilevered design of the wind turbine 12. Of course, this bending moment at the lower end of the tower 16 is transferred to and accommodated by the foundation 14 of the wind turbine installation 10. Line 36 in FIG. 2 is a schematic representation of the bending moment profile experienced by the tower 16 due to the operation of the energy generating unit 18 (not shown in FIG. 2). Line 38 (up to point A) represents the maximum bending moment in the tower 16 and the bending moment that is transferred to and accommodated by the foundation 14. In the normal course, the foundation 14 is then designed (e.g., size, strength, etc.) to withstand the loads associated with the magnitude of the bending moment represented by line 38.

As noted above, when a replacement process is implemented, it is desirable to replace the wind turbine with a more modern wind turbine. Modern wind turbines typically have an increased height and an increased rotor diameter as a result of longer wind turbine blades. The increased height not only accommodates the longer blades, but also locates the rotor at an increased height above ground having smoother, faster moving air. The increased blade length and rotor diameter increases the energy capture area of the wind, resulting in greater power generation from the wind turbine.

In FIG. 2, the tower of a retrofitted wind turbine installation of conventional design is represented by reference numeral 40 and has a height $h_2$ corresponding to the height of the tower of the retrofitted wind turbine installation, which is illustrated as being significantly greater than the height of the existing tower 16. As used herein, the term "conventional design" should be understood as a wind turbine installation without stay cables. As explained in detail below, it should be appreciated that the tower of the retrofitted wind turbine installation may comprise only the replacement tower (see FIGS. 3-7), or a combination of the prior tower (including portions thereof) and the replacement tower (see FIGS. 8-10). Similar to the above, line 42 in FIG. 2 is a schematic representation of the bending moment profile experienced by a tower of conventional design due to the operation of the more modern energy generating unit (not shown in FIG. 2). Also similar to the above, line 44 (up to point B) represents the maximum bending moment in the tower and the bending moment that is transferred to and accommodated by the foundation 14. As would be expected, the bending moment 44 accommodated by the foundation of a retrofitted wind turbine installation of conventional design is significantly larger than the bending moment accommodated by the foundation 14 of the existing wind turbine installation 10 (e.g., four or five times larger). Thus, in the normal course, foundation 14 of the existing wind turbine installation 10 is not able to accommodate the loads being imposed on the foundation 14 from the replacement wind turbine for any sustainable period of time, let alone the full expected operating life of the replacement wind turbine (e.g., twenty more years). In other words, the bending loads imposed on foundation 14 from the retrofitted wind turbine installation having a conventional design typically exceeds the load capability of the foundation 14. Consequently, and according to convention thought, a new foundation must be provided for the retrofitted wind turbine installation.

While the need for a new foundation is clearly understandable based on the above, it is this need that contributes to the significant time delays and high costs of conventional wind turbine installation replacement. The present invention addresses the need for a new foundation in a wind turbine installation replacement process, even when a large, modern wind turbine replaces the existing wind turbine. More particularly, in one aspect of the present invention, a large, modern wind turbine may be located on a foundation of an existing wind turbine installation that has, for example, a wind turbine that is overly inefficient, non-operational, and/or has reached the end of its useful life. Through this invention, the long delays associated with the removal of the existing foundation and the installation of a new foundation are avoided. As a result, the large crane that is brought to the installation site to disassemble the existing wind turbine may stay on site and be used to assemble the replacement wind turbine on the existing foundation. The ability to use the large crane for disassembly and assembly without delay significantly reduces the costs of the crane and associated transportation costs. In this regard, the large crane need only be transported to the wind turbine installation site once, not twice as in conventional replacement processes. It is contemplated that implementing aspects of the present invention will reduce the time of the replacement process from a couple of months to just a few days. More particularly, it is believed that the disassembly of the existing wind turbine and the assembly of the replacement wind turbine can be accomplished in just two or three days. This represents a major improvement in timing of the replacement process. It is further believed that the cost of the replacement process in accordance with aspects of the present invention may be a mere fraction of the current costs associated with conventional replacement processes. Additionally, the existing wind turbine installation will be able to produce power up until the time disassembly of the existing wind turbine commences. Thus, the loss of operating time on the installation site is reduced.

As discussed above, FIG. 2 makes clear that in the normal course, the existing foundation 14 is unable to accommodate the bending loads imposed thereon by a modern replacement wind turbine for any sustainable period of time. Accordingly, to reuse the existing foundation 14 with a modern wind turbine, the bending loads imposed on the foundation 14 from the replacement wind turbine must be significantly reduced. In accordance with one aspect of the invention, this is achieved by using a cable-stayed wind turbine tower. In a cable-stayed tower, a plurality of stay cables are connected at one end to the tower, such as at a cable mounting position, and at the other end connected to corresponding stay cable foundations positioned, for example, in the ground and in spaced relation to the tower. A stay cable means a cable which provides support for the tower, and in particular with respect to bending moments on the tower. By using a cable-stayed tower, it is possible to alter the bending moment profile experienced by the tower due to operation of the energy generating unit at the top of the tower. For example, through the use of stay cables, it is possible to reduce stresses in selective parts of the tower. More particularly, stay cables provide stability to the tower to reduce oscillations from wind and reduce the loads in the part of the tower generally below the cable mounting position. In other words, the portion of the tower below the cable mounting position is to some extent de-loaded by the stay cables since the imposed loads are now being accommodated by both the tower and the stay cables. The loads taken up by the stay cables are ultimately transferred to and accommodated by the stay cable foundations. Preferably, three or more stay cables may be coupled to the tower. Moreover, stay cables may be positioned at multiple heights on the tower. Thus, for example three or more stay cables may be attached to the tower at a first height, and three or more stay cables may be attached to the tower at a second, different height (e.g., see FIG. 11). Thus, multiple stay cable arrangements may be used in accordance with the invention.

The effect of stay cables is schematically illustrated in FIG. 2. In this regard, suppose that the tower of the retrofitted wind turbine installation, corresponding to line 40, was not of the conventional design, but included stay cables that have a stay cable mounting position at a height $h_3$ of the tower. In that case, the bending moment profile would be provided by line 42 from the apex of the replacement tower to point C along the profile 42 at the height $h_3$. As a result of the stay cables, however, below $h_3$ the bending moment experienced in the tower starts decreasing. The bending moment profile in the remaining portion of the tower as a result of the stay cables is illustrated in FIG. 2 by line 46. Not only do the stay cables reduce the bending moment experienced by the tower, but as evident in this schematic illustration, it may be possible that there is a point in the tower that experiences no bending moment. This is illustrated at point D in FIG. 2. Additionally, if that point is above the base of the tower (as is illustrated in FIG. 2), the tower may actually experience a change in direction of the bending moment. This reversal in the bending moment is the portion of line 46 identified as reference number 46a.

By using the stay cables, not only does the bending moment experienced by the tower decrease below the stay cable mounting position, but the bending moment and loads that must be accommodated by the foundation may also decrease. In this regard, the bending moment experienced by the foundation of the cable-stayed tower in the retrofitted wind turbine installation is schematically illustrated by line 48 (up to point E). In an exemplary embodiment, this bending moment 48 may be significantly less than the bending moment 44 experienced by a foundation supporting the replacement wind turbine having a conventional design (e.g., a cantilevered design). Moreover, the foundation bending moment 48 of the cable-stayed tower may also be less than the foundation bending moment 38 from the existing wind turbine 12. In this way, the foundation 14 is able to support the replacement wind turbine having the cable-stayed tower over a sustained period of time. Ideally, the design of the cable-stayed tower is configured such that the remaining useful life of the existing foundation (and any reused portion of the prior tower, as discussed below) is stretched to substantially match the operating life of the replacement wind turbine (e.g., approximately twenty years). This may be achieved by reducing the loads experienced by the foundation (and reused tower portion, if any) to levels that allow its operating life to be extended (e.g., lighter loads results in longer operating life for a given foundation).

Figure 3:
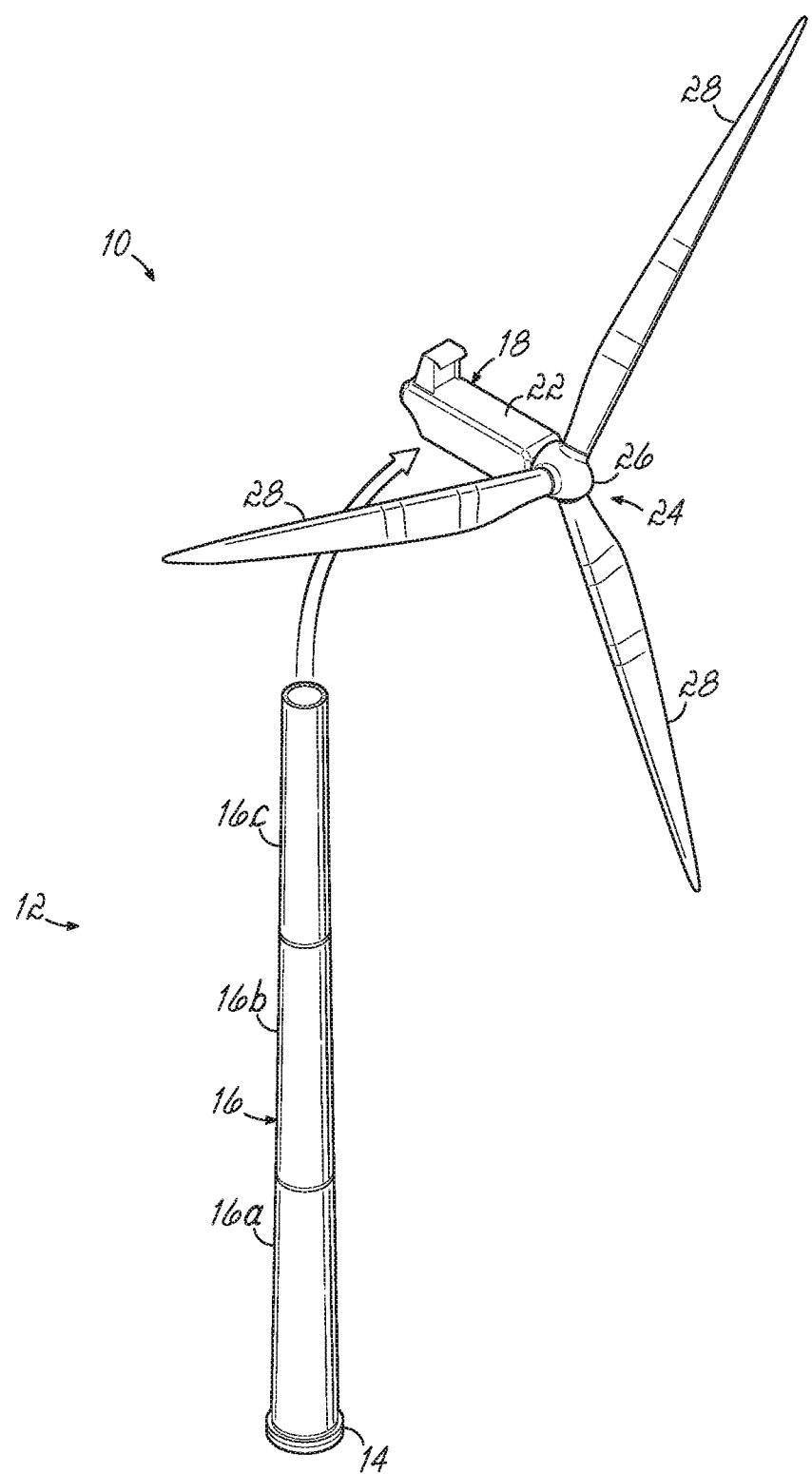
FIGS. 3 and 4 illustrate disassembly of the existing wind turbine installation in accordance with an embodiment of the invention.
Figure 4:
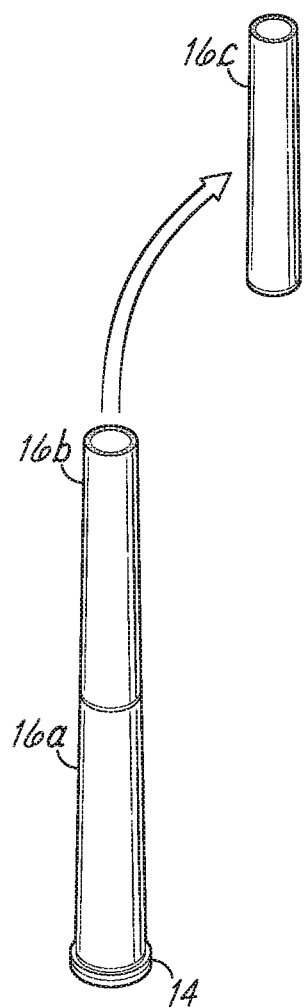

FIGS. 3-7 illustrate a method of retrofitting an existing wind turbine installation 10 with a replacement wind turbine in accordance with an exemplary embodiment of the present invention. In this regard, and in an initial step shown in FIGS. 3 and 4, the existing wind turbine 12 (i.e., the tower 16 and the energy generating unit 18) may be disassembled. To this end, a large crane (not shown) may be transported to the wind turbine installation site and used to remove the energy generating unit 18 from the top of the tower 16 (FIG. 3). It should be appreciated that portions of the rotor 24 may be removed prior to removal of the nacelle 22. For example, one or more of the blades 28 may be separately removed from the hub 26 prior to the nacelle 22 being removed from the top of the tower 16. In many cases, the wind turbine tower 16 will include tower sections 16a, 16b, 16c. After removal of the energy generating unit 18, the tower sections 16a, 16b, 16c may be removed using the large crane. The removal of the tower sections 16a, 16b, 16c may be done simultaneously or in a serial manner, such that the foundation 14 of the existing wind turbine installation 10 is substantially all that remains of the existing wind turbine installation.

Figure 5:
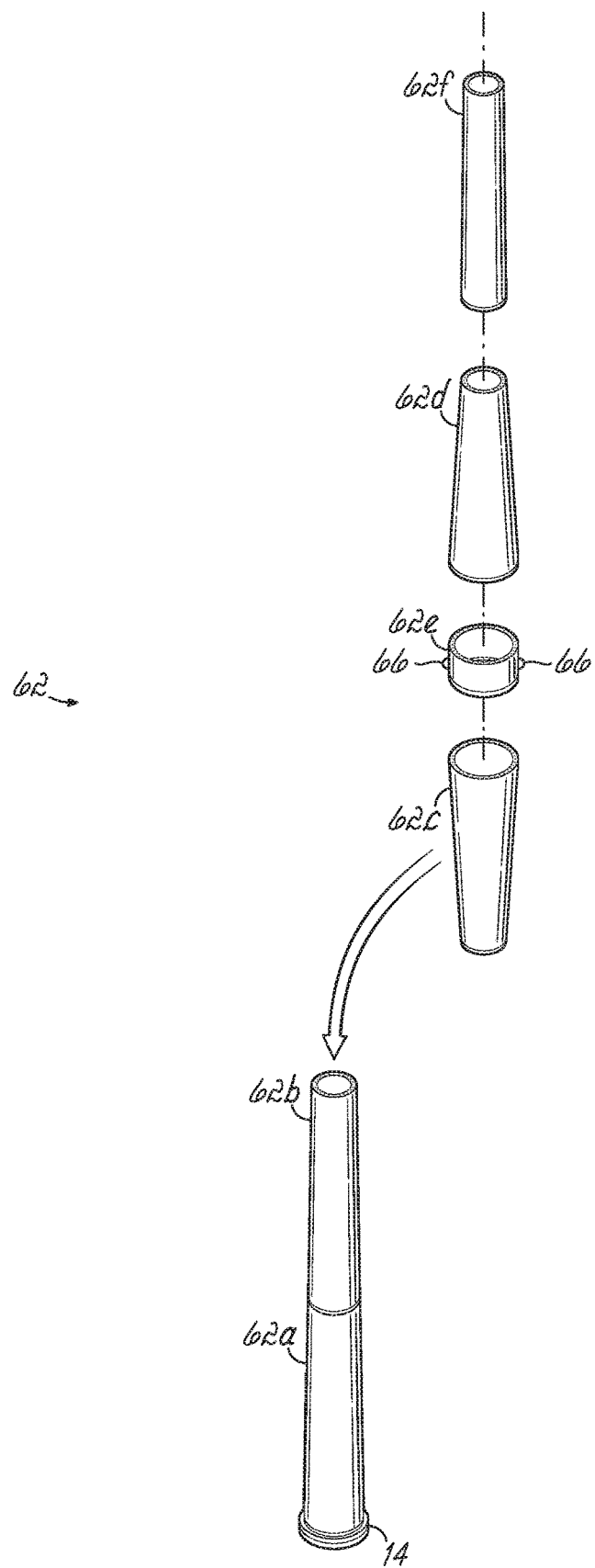
FIGS. 5 and 6 illustrate assembly of a replacement wind turbine on an existing foundation in accordance with an embodiment of the invention.
Figure 6:
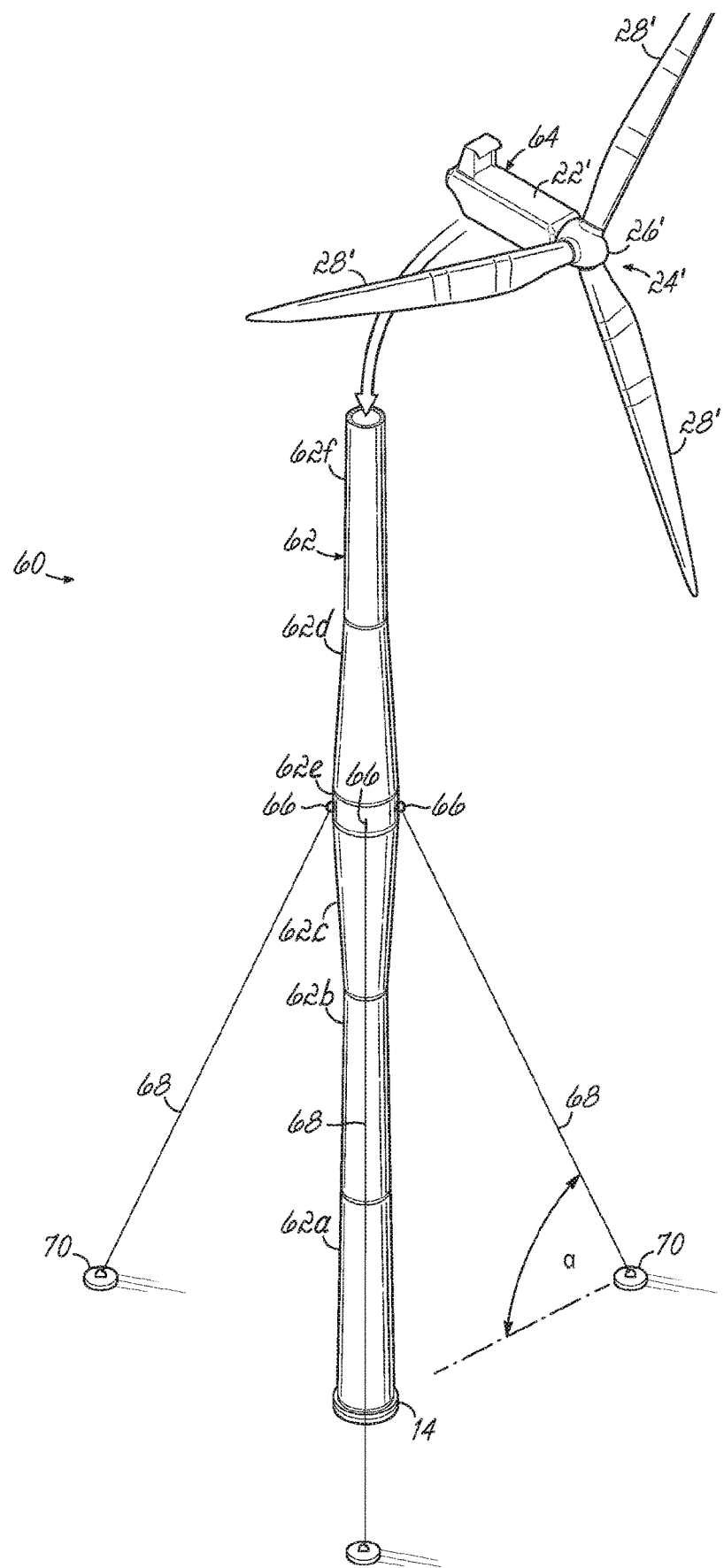

At this point and as illustrated in FIGS. 5 and 6, the replacement wind turbine 60 may be assembled so as to be coupled to and supported by the existing foundation 14. This assembly may be achieved using the large crane that was used for the disassembly of the existing wind turbine, and which has preferably remained at the installation site after the disassembly of the existing wind turbine 12. In this exemplary embodiment, the replacement wind turbine 60 includes a replacement tower 62 and a replacement energy generating unit 64. As noted above, the tower of the retrofitted wind turbine installation, which in this embodiment is substantially formed by the replacement tower 62, may be significantly taller than the prior tower 16 so as to position the replacement energy generating unit 64 even further into the air where faster, less turbulent wind currents exist. Additionally, the replacement energy unit 64 includes larger, longer blades, as well as more efficient generators, gear boxes, converters and other improved wind turbine components, that result in increased power output.

In this embodiment, the replacement tower 62 is configured as a cable-stayed tower having multiple tower sections, including a lower tower section 62a sized and configured to couple to the existing foundation 14. The lower tower section 62a a may be directly coupled to the foundation 14. Alternatively, the lower tower section 62a may be coupled to the foundation via a mounting plate or the like. One or more further tower sections 62b (one shown) may then be coupled to the upper end of the lower tower section 62a. The cable mounting position 66 is a position along the tower 62 between the foundation 14 and the nacelle 22', where the stay cables are connected to the tower 62. In order to allow the stay cables to provide the required support for the tower 62, the cable mounting position 66 should be arranged at a certain distance from the foundation 14, and thereby from the ground. Furthermore, the cable mounting position 66 may advantageously be arranged below the rotor 24' of the wind turbine 60, i.e., below the lowest point that the tips of the wind turbine blades 28' pass, in order to ensure that no collisions occur between the wind turbine blades 28' and the stay cables.

The tower 62 generally has a first tower diameter at the cable mounting position 66. The first tower diameter should be sufficiently large to provide the required strength to the tower 62 at the cable mounting position 66, allowing the tower 62 to handle the loads applied to the tower by pulling forces in the stay cables. Furthermore, the first tower diameter should be sufficiently large to accommodate tensioning equipment for tensioning the stay cables inside the tower 62 at the cable mounting position 66. It may therefore be desirable that the first tower diameter be larger than the diameter of the tower at other positions along the length of the tower. Accordingly, and in an exemplary embodiment, the replacement tower 62 may further include a lower transition section 62c and an upper transition section 62d, wherein each of the transition sections may be tapered. The lower transition section 62c forms part of the tower 62 below the cable mounting position 66 and the upper transition section 62d forms part of the tower 62 above the cable mounting position 66. Accordingly, the lower and upper transition sections 62c, 62d are arranged in or immediately adjacent to the region of the tower 62 where the cable mounting position 66 is located. The diameter of the lower transition section 62c increases along an upwards direction, and the diameter of the upper transition section 62d decreases along an upwards direction. Thus, the diameter of the tower 62 is generally smaller than the first tower diameter in a region immediately below the cable mounting position as well as in a region immediately above the cable mounting position. Thereby, the cable mounting position defines at least a local maximum of the tower diameter.

In this exemplary embodiment, the replacement wind turbine tower 62 may further include a cable mounting section 62e arranged between the lower transition section 62c and the upper transition section 62d, wherein the cable mounting section 62e includes the cable mounting position 66. In accordance with this embodiment, the cable mounting section 62e may have a generally cylindrical shape with a diameter being equal to the maximum diameter of the lower transition section 62c and to the maximum diameter of the upper transition section 62d. This diameter also defines the maximum diameter of the wind turbine tower 62, as noted above. Moreover, the cable mounting section 62e may have a height that is significantly smaller than the height of each of the lower transition section 62c and the upper transition section 62d. Furthermore, one or more additional tower sections 62f (one shown) may be coupled to the upper end of the upper transition section 62d to complete the replacement tower 62. In the embodiment described above, the strength of the tower 62 in the vicinity of the cable mounting position 66 was increased through an increase in the local diameter of the tower 62. In an alternative embodiment, however, the strength of the tower 62 in the vicinity of the cable mounting position 66 may be increased through an increase in the local wall thickness of the tower 62 at the cable mounting position 66. Additionally, it should be realized that the tower 62 may include multiple cable mounting positions 66 along the height of the tower, such that stay cables extend from the tower 62 at multiple tower heights (e.g., see FIG. 11). Thus, the arrangement of the stay cables is not limited to that shown in the figures.

With the multiple sections of the replacement tower 62 assembled, the stay cables 68 may be arranged on the tower 62. In this regard, the replacement tower 62 may include a plurality of stay cables which are connected at one end at the cable mounting position 66 on the cable mounting section 62e, and at the other end to respective stay cable foundations 70. In a preferred embodiment, three or more stay cables are mounted to the tower 62 (e.g., so as to lie in multiple planes). Although the stay cable foundations 70 take time to install in the area around the foundation 14, in one aspect of the invention, the stay cable foundations 70 may be installed prior to the disassembly of the existing wind turbine 12. By way of example, the stay cable foundations 70 may be installed in the region of the foundation 14 while the existing wind turbine installation 10 is operational. In this way, once the decision is made to stop the existing wind turbine 12 and install the replacement wind turbine 60, the stay cable foundations 70 have already cured, settled, or otherwise been prepared for immediate use. Thus, their installation adds no time to the replacement process once it begins. As noted above, the replacement tower 62 and/or the stay cable foundations 70 may include equipment (not shown) generally known in the art for tensioning the stay cables 68 to their design values.

Lastly, and as illustrated in FIG. 6, the replacement energy generating unit 64 may be coupled to the top of the replacement tower 62. In this regard, the large crane may be used to lift the energy generating unit 64 to the top of the tower 62. It should be realized that portions of the rotor 26' may be attached subsequent to attachment of the nacelle 22'. For example, one or more of the blades 28' may be separately attached to the hub 26' subsequent to the nacelle 22' being connected to the top of the tower 62. Thus, the attachment of the energy generating unit 64 may take several intermediate lifts of the large crane.

Figure 7:
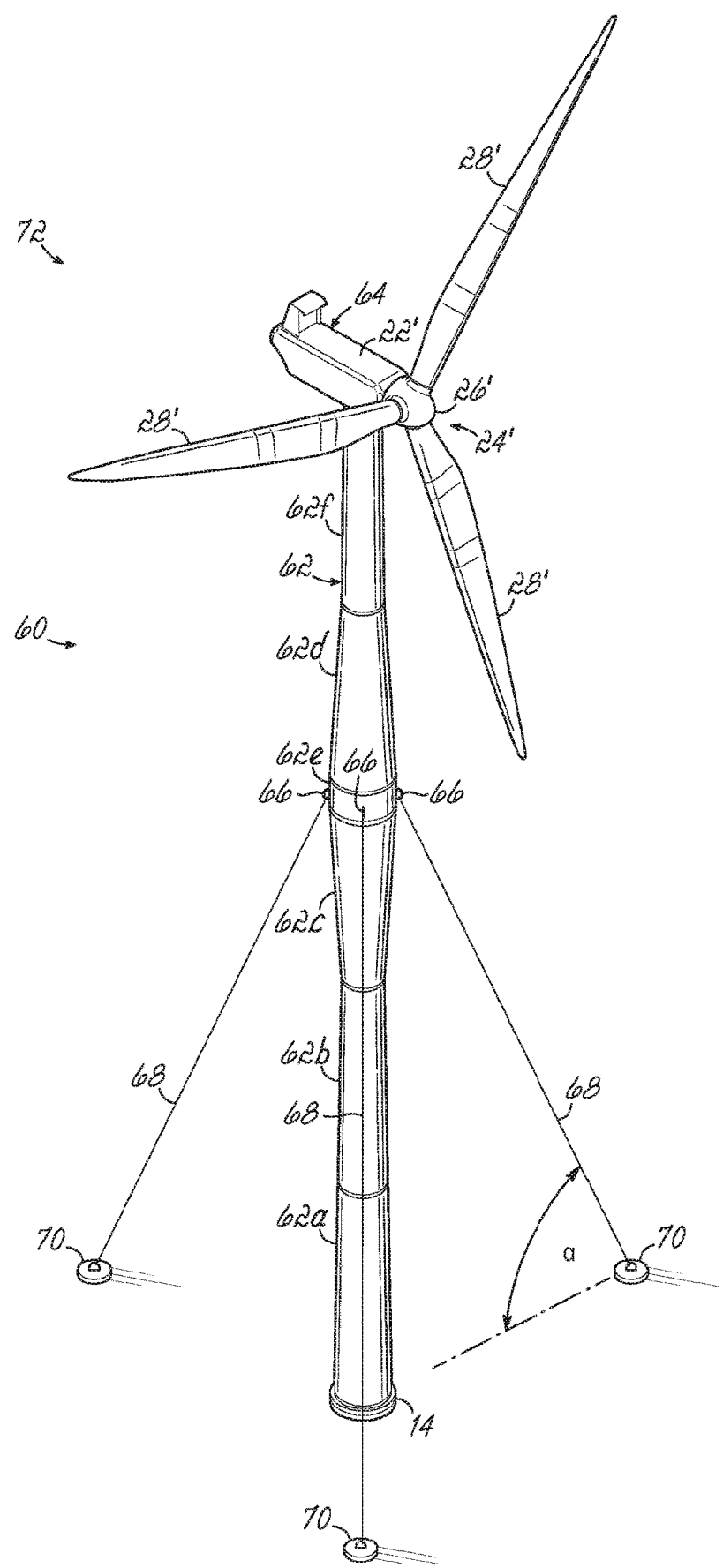
FIG. 7 illustrates a retrofitted wind turbine installation in accordance with an embodiment of the invention.

FIG. 7 illustrates a retrofitted wind turbine installation 72 in accordance with an embodiment of the invention. More particularly, FIG. 7 illustrates a replacement wind turbine 60, including a replacement tower 62 and a replacement energy generating unit 64 being disposed on a foundation 14 that formed part of a previous wind turbine installation 10. The replacement wind turbine tower 62 of the retrofitted wind turbine installation 72 is configured as a cable-stayed tower characterized by a plurality of stay cables 68 extending from the cable mounting position 66 at the cable mounting section 62e of the tower 62 to stay cable foundations 70 disposed about the foundation 14. As discussed above, although the replacement wind turbine 60 is too large for the foundation 14 (if having a conventional design), by use of the cable-stayed tower 62, the loads transferred to the foundation 14 are significantly reduced. Accordingly, it is believed that the foundation 14 can support the replacement wind turbine 60 substantially for the operating life of the replacement wind turbine.

Figure 8:
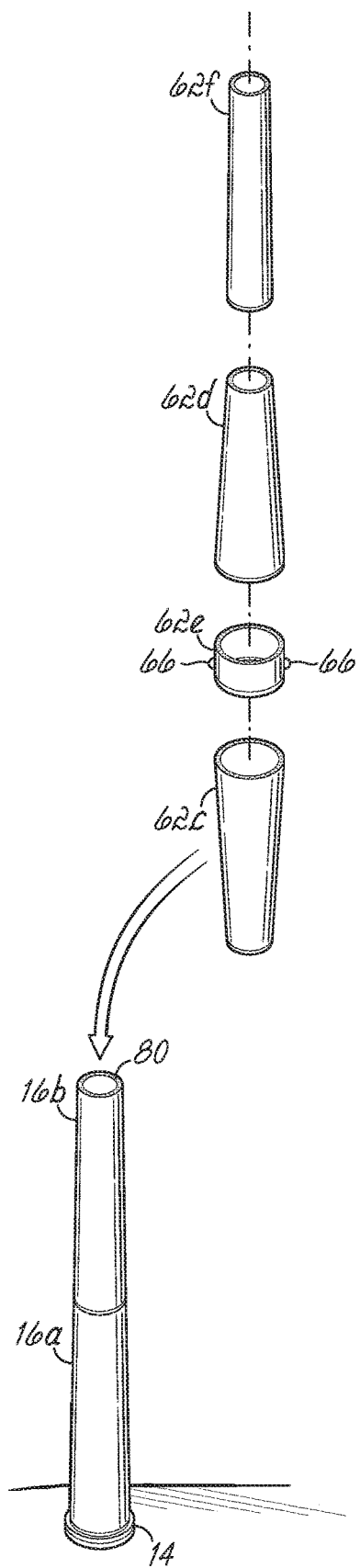
FIGS. 8 and 9 illustrate assembly of a replacement wind turbine on a portion of an existing tower in accordance with another embodiment of the invention.
Figure 9:
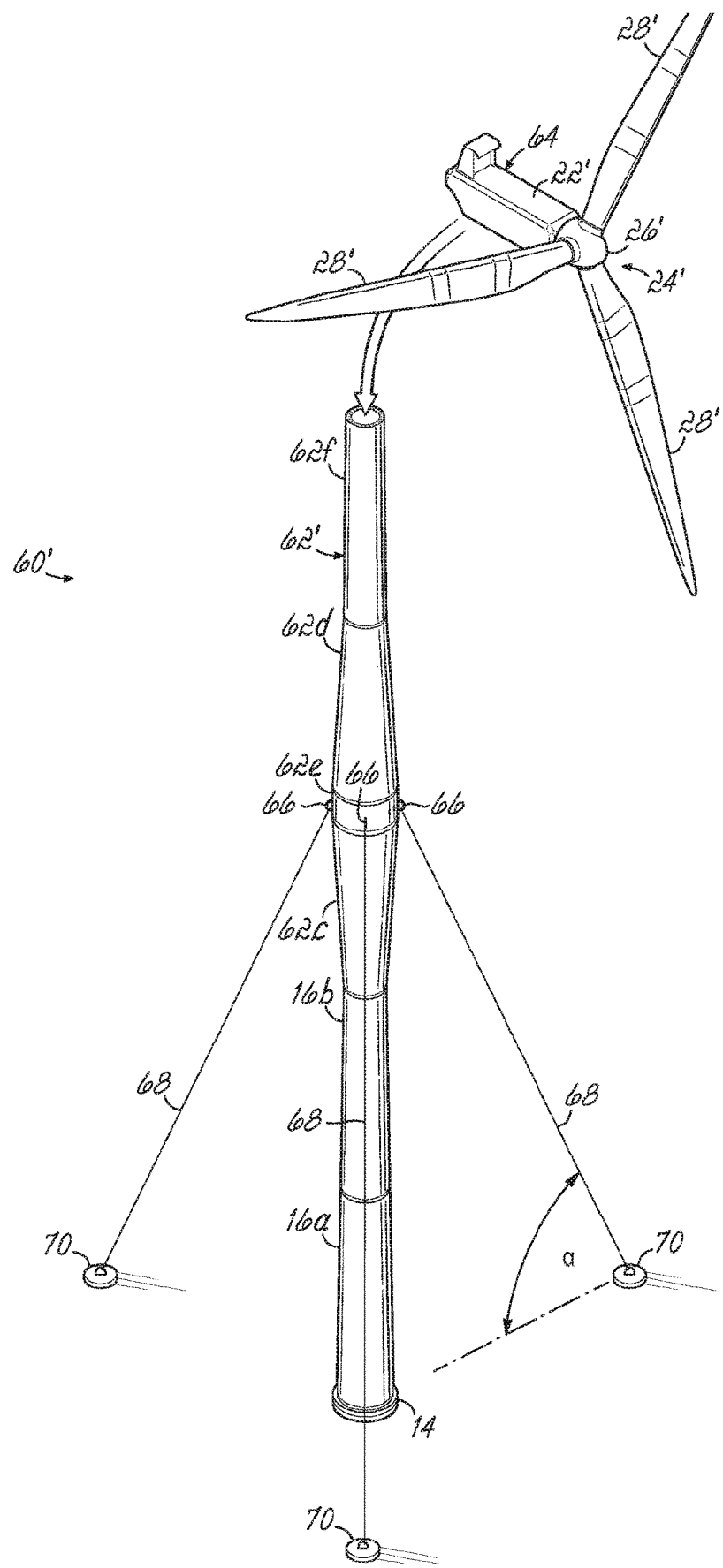
Figure 10:
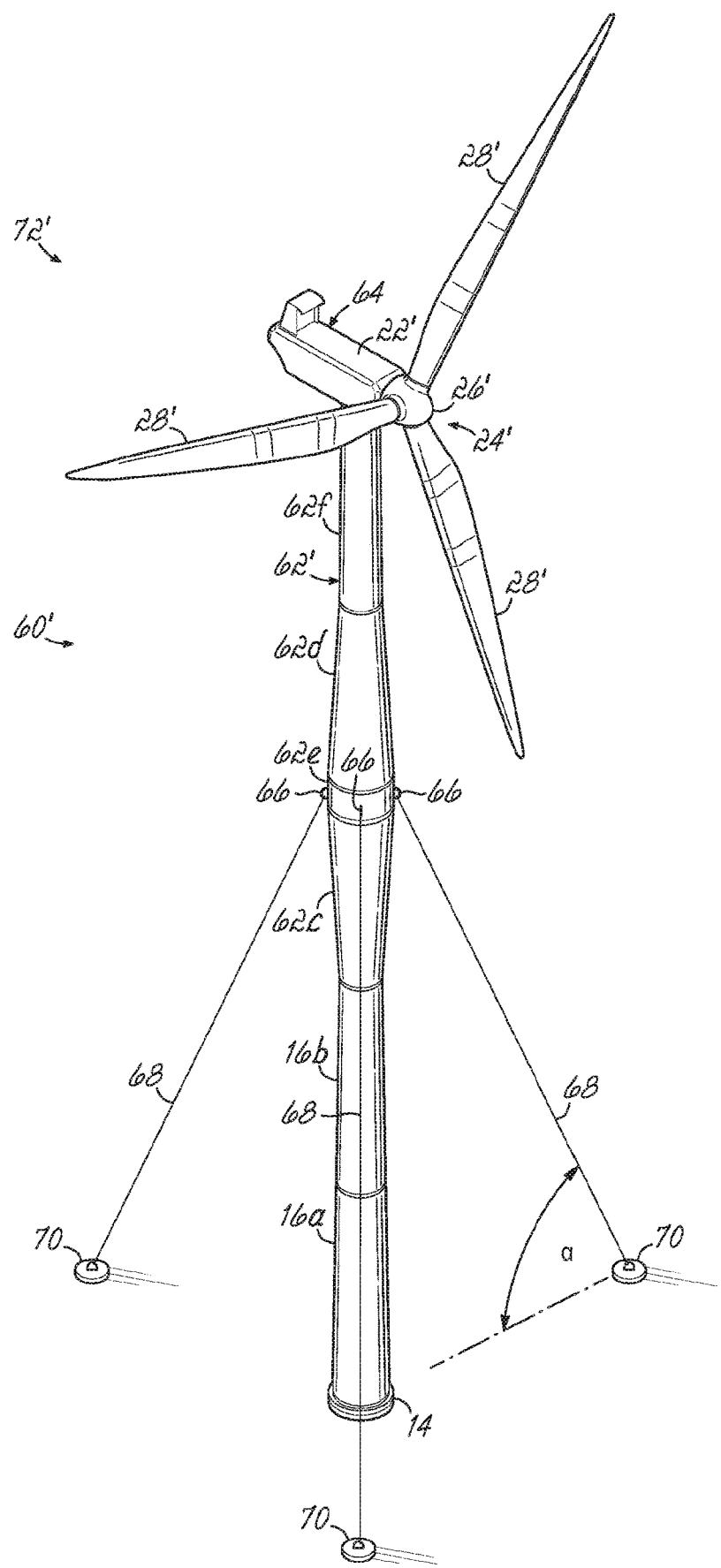
FIG. 10 illustrates a retrofitted wind turbine installation in accordance with another embodiment of the invention.

The embodiment illustrated in FIGS. 3-7 replaced the existing wind turbine 12 with a replacement wind turbine 60, wherein the portion of the existing wind turbine installation 10 reused in the retrofitted wind turbine installation 72 constituted just the foundation 14. Aspects of the present invention, however, are not so limited. In this regard, FIGS. 8-10 illustrate an alternative method of retrofitting an existing wind turbine installation 10 with a replacement wind turbine. In this regard and as noted above, in the previous embodiment the only portion of the existing wind turbine installation 10 that was reused in the retrofitted wind turbine installation 72 was the foundation 14. In some instances, however, it may be possible to use more of the existing wind turbine installation 10 in a retrofitted wind turbine installation 72'. More particularly, and in an exemplary alternative embodiment, at least a portion of the existing tower 16 may be reused in the retrofitted wind turbine installation 72'. Such an embodiment is schematically illustrated in FIG. 2. In this regard, ha represents the height of an interface 74 where the existing tower 16 ends and the replacement tower 62' begins. The bending loads in the existing tower 16 at the interface 74 when forming part of the retrofitted wind turbine installation is represented by line 76 (up to point F) and may be the maximum bending stress experienced by what remains of the existing tower 16. At this reduced bending load level, it may be possible for the remaining portion of the existing tower 16 to support the replacement wind turbine 60 for substantially all of the operating life of the replacement wind turbine (e.g., twenty more years).

In this regard, the amount of the existing tower 16 that may be reused in the retrofitted wind turbine installation 72' may be determined, for example, after a thorough examination of the existing tower 16. More particularly, the existing tower 16 may be visually inspected and/or subjected to any number of non-destructive testing methodologies (e.g., ultrasound) to determine the overall health and integrity of the existing tower 16. Such testing techniques are generally known in the art and will not be further described herein. In any event, after inspection and/or testing, the maximum permissible bending stress in the existing tower 16 may be determined, which will in turn determine the amount of the existing tower 16 that may be reused in the retrofitted wind turbine installation, for a specified tower height and replacement energy generating unit. The line 76 represents the maximum permissible bending stress in the existing tower 16 and ha represents the amount of the existing tower 16 that may be reused in order to stay within the specified limits.

It should be realized that there are a number of design parameters that can be manipulated or adjusted in order to optimize the configuration of the retrofitted wind turbine installation 72'. In this regard, once the replacement energy generating unit 64 is selected, the height of the tower may be determined (i.e., the sum of the tower portion of the previous wind turbine installation and the replacement tower). From this information, the location or height of the cable mounting position 66 may be determined. For example, the height of the cable mounting position 66 may be selected so as to be just beneath the tip of the wind turbine blades 28' so as to maximize the height of the cable mounting position 66 but not interfere with the rotation of the blades 28'. However, the location of the cable mounting position 66 may be moved downwardly from the tip of the blades 28'. For example, in one embodiment, the cable mounting position 66 may be selected to be the original height of the existing tower 16. Other locations of the cable mounting position 66 may also be selected within the scope of the invention. Additionally, multiple cable mounting positions may be distributed along the length tower. In this regard, a cable mounting position 66 may be located on the replacement tower, the portion of the previous tower reused in the retrofitted wind turbine installation (such as through a retrofit on the previous tower portion), or on both.

Figure 11:
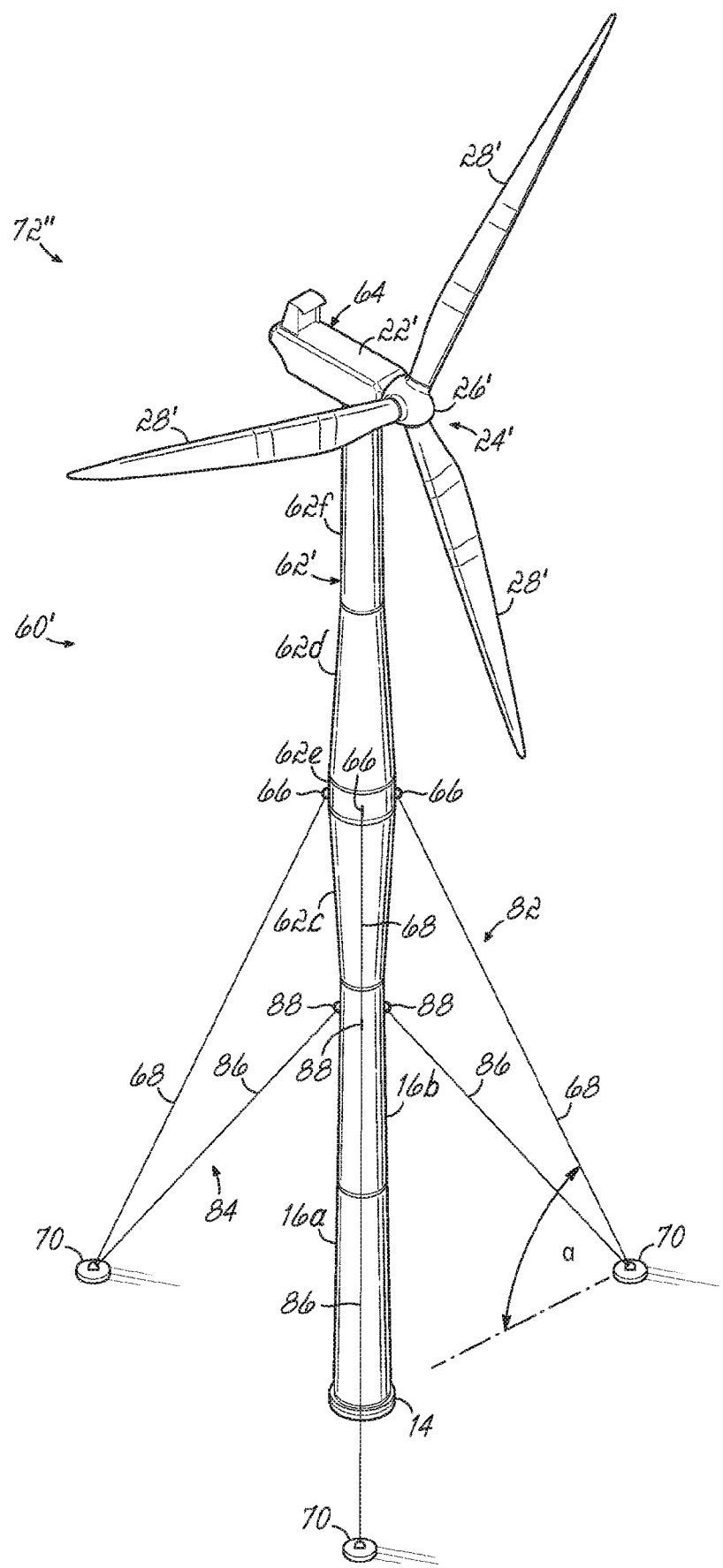
FIG. 11 illustrates a retrofitted wind turbine in accordance with yet another embodiment of the invention.

FIG. 11, for example, illustrates a retrofitted wind turbine installation 72" similar to that shown in FIG. 10. In this embodiment, however, the arrangement of the stay cables has been modified. More particularly, the tower of the retrofitted wind turbine installation 72" includes a first set 82 of stay cables 68 at a first cable mounting position 66 and at a first height of the tower of the retrofitted wind turbine installation 72". Additionally, however, the retrofitted wind turbine installation 72" may include a second set 84 of stay cables 86 at a second cable mounting position 88 and at a second height of the tower of the retrofitted wind turbine installation 72". In one embodiment, the first set 82 of the stay cables 68 may have the cable mounting position 66 disposed along the replacement tower 62', and the second set 84 of the stay cables 86 may have the cable mounting position 88 disposed along the remaining portion of the tower 16 of the prior wind turbine installation 10. Other arrangements, such as both cable mounting positions being disposed on the replacement tower 62' may also be possible. Including multiple cable mounting positions on the tower of the retrofitted wind turbine installation 72" may further reduce the bending loads transferred to the foundation 14. In any event, once the cable mounting position(s) 66 is (are) selected, this generally determines the maximum bending moment in the replacement tower 62 (represented by line 78 (up to point C in FIG. 2). This essentially fixes point C in the bending stress profile for the cable-stayed tower 62.

There are, however, a number of parameters that may be manipulated so as to vary the location of point E shown in FIG. 2, i.e., the foundation bending moment of the retrofitted wind turbine installation 72' (represented by line 48). For example, and without limitation, the diameter of the stay cables 68, the angles α made by the stay cables 68 (e.g., relative to ground), the distance of the stay cable foundations 70 from the base of the tower 62', the properties of the stay cables (such as materials and stiffness) and possibly other parameters may be varied in order to move point E closer to or further away from the vertical line representing the tower 62'. The manipulation of these parameters varies the bending moment profile in the region below the cable mounting position 66, and these parameters may be varied depending on the maximum permissible bending stress analysis (e.g., inspection and/or non-destructive testing of the existing tower 12) so that the height of the existing tower 16 that may be reused can be determined.

Once that is determined, the replacement process is similar to that described above in reference to FIGS. 3-7. Since the existing tower 16 typically includes multiple sections 16a, 16b, 16c, in one embodiment, one or more of the top sections of the existing tower 16 may be removed until the height of the existing tower is equal to or less than that determined from the optimization analysis. In other words, in this embodiment, one does not simply cut of the upper portion of the existing tower 16 and attach the replacement tower 62 at that cut location (although that can be done). Instead, in an exemplary embodiment the existing tower 16 is simply taken down to one of its existing tower section interfaces (which is at a height less than the determined value) and the replacement tower 62 is attached to the upper end of the remaining tower section.

Accordingly, this alternative replacement process starts similarly to that described above in reference to disassembling the existing wind turbine 12. However, as illustrated in FIG. 8, one or more sections 16a, 16b (could be more or less sections) remain attached to the existing foundation 14 and the replacement tower 62' is coupled to the upper end 80 of the remaining existing tower 16. The replacement tower 62' includes sections 62c-62f as described above. One or more additional tower sections (not shown) may be disposed between the upper end 80 of the existing tower 16 and the lower transition section 62c. Again, it should be appreciated that the tower of the retrofitted wind turbine installation 72' includes the portion of the prior tower 16a, 16b and the replacement tower 62'. In any event, once the replacement tower 62 is assembled, the replacement energy generating unit 64 may be coupled to the top of the replacement tower 62', such as with the large crane.

FIG. 10 illustrates a retrofitted wind turbine installation site 72' in accordance with an alternative embodiment of the invention. More particularly, FIG. 10 illustrates a replacement wind turbine 60', including a replacement tower 62' and a replacement energy generating unit 64 being disposed on a portion of the tower 16 supported by foundation 14 that formed part of a previous wind turbine installation 10. The tower of the retrofitted wind turbine installation 72' (i.e., the combination of the "old" tower and the "new" tower) is configured as a cable-stayed tower characterized by a plurality of stay cables 68 extending from a cable mounting position 66 at a cable mounting section 62e of the replacement tower 62' to stay cable foundations 70 disposed about the foundation 14. As noted above, stay cables may alternatively or additionally extend from cable mounting positions on the tower portion of the previous wind turbine installation, as illustrated in FIG. 11. In addition to the advantages provided above in regard to the previous embodiment, this embodiment provides the further advantage that fewer tower sections must be manufactured, transported, and assembled during the replacement process. Accordingly, the costs associated with manufacturer, transport and assembly of the replacement wind turbine may be further reduced.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A retrofitted wind turbine installation for replacing a prior wind turbine installation, the prior wind turbine installation including a foundation and a wind turbine supported on the foundation, the retrofitted wind turbine installation comprising:

the foundation of the prior wind turbine installation; and a replacement wind turbine supported by the foundation, the replacement wind turbine including a replacement tower and a replacement energy generating unit;

wherein the tower of the retrofitted wind turbine installation is a cable-stayed tower having a plurality of stay cables connected at one end to the tower at a cable mounting position and at the other end to stay cable foundations, the plurality of stay cables configured to reduce bending loads being transferred to the foundation and thereby extend an operating life of the foundation.

2. The retrofitted wind turbine installation according to claim 1, wherein the tower of the retrofitted wind turbine installation comprises a portion of the tower of the prior wind turbine installation coupled to the foundation, and wherein the replacement tower is coupled to the portion of the tower from the prior wind turbine installation.

3. The retrofitted wind turbine installation according to claim 2, wherein the prior wind turbine included a tower formed from a plurality of tower sections, and wherein an interface between the replacement tower and the portion of the tower from the prior wind turbine installation occurs at an end of a tower section of the prior tower.

4. The retrofitted wind turbine installation according to claim 2, wherein the portion of the tower from the prior wind turbine installation includes a location along its height having no bending moment.

5. The retrofitted wind turbine installation according to claim 1, wherein the wind turbine of the prior wind turbine installation included a tower and an energy generating unit, and wherein a height of the tower in the retrofitted wind turbine installation is greater than a height of the tower in the prior wind turbine installation.

6. The retrofitted wind turbine installation according to claim 1, wherein the wind turbine of the prior wind turbine installation included a tower and an energy generating unit, and wherein the replacement energy generating unit in the retrofitted wind turbine installation has a greater energy generating capacity than the energy generating unit in the prior wind turbine installation.

7. The retrofitted wind turbine installation according to claim 1, wherein the bending loads imposed on the foundation from operation of the replacement wind turbine would exceed the capacity of the foundation in the absence of the plurality of stay cables.

8. The retrofitted wind turbine installation according to claim 1, wherein the replacement tower further comprises:
   a lower transition section forming part of the replacement tower below the cable mounting position, wherein a diameter of the lower transition section increases in an upward direction;
   an upper transition section forming part of the replacement tower above the cable mounting position, wherein a diameter of the upper transition section decreases in an upwards direction; and
   a cable mounting section arranged between the lower transition section and the upper transition section, the cable mounting section including the cable mounting position.

9. The retrofitted wind turbine installation according to claim 1, wherein the replacement tower has a first tower diameter at the cable mounting position and the first tower diameter defines a maximum diameter of the replacement tower.

10. The retrofitted wind turbine installation according to claim 1, wherein the tower of the retrofitted wind turbine installation has a thickened tower section with an increased wall thickness, the thickened tower section including the cable mounting position.

11. A method of retrofitting an existing wind turbine installation with a replacement wind turbine to form a retrofitted wind turbine installation, the existing wind turbine installation including a foundation and a wind turbine having a tower and an energy generating unit, the method comprising:
   disassembling at least a portion of the existing wind turbine;
   assembling a replacement tower to a remaining portion of the existing wind turbine installation, the replacement tower being a cable-stayed tower, the method further comprising;
   attaching a plurality of stay cables between the tower of the retrofitted wind turbine installation and stay cable foundations and tensioning the plurality of stay cables, wherein the stay cables reduce the bending loads being transferred to the foundation; and
   attaching a replacement energy generating unit to the replacement tower,
   wherein disassembling at least a portion of the existing wind turbine further comprises disassembling the energy generating unit and the tower of the existing wind turbine installation, thereby leaving the foundation to be reused with the retrofitted wind turbine installation.

12. The method according to claim 11, wherein assembling the replacement tower further comprises coupling the replacement tower to the foundation of the existing wind turbine installation.

13. The method according to claim 11, further comprising forming the stay cable foundations prior to disassembling the at least a portion of the existing wind turbine.

14. A method of retrofitting an existing wind turbine installation with a replacement wind turbine to form a retrofitted wind turbine installation, the existing wind turbine installation including a foundation and a wind turbine having a tower and an energy generating unit, the method comprising:
   disassembling at least a portion of the existing wind turbine;
   assembling a replacement tower to a remaining portion of the existing wind turbine installation, the replacement tower being a cable-stayed tower, the method further comprising;
   attaching a plurality of stay cables between the tower of the retrofitted wind turbine installation and stay cable foundations and tensioning the plurality of stay cables, wherein the stay cables reduce the bending loads being transferred to the foundation; and
   attaching a replacement energy generating unit to the replacement tower,
   wherein disassembling at least a portion of the existing wind turbine further comprises disassembling a portion of the tower of the existing wind turbine installation, thereby leaving the foundation and a remaining portion of the tower of the existing wind turbine installation to be reused with the retrofitted wind turbine installation.

15. The method according to claim 14, wherein the tower of the existing wind turbine installation includes a plurality of tower sections, and wherein disassembling at least a portion of the tower further comprises disassembling one or more tower sections of the tower of the existing wind turbine installation.

16. The method according to claim 14, wherein assembling the replacement tower further comprises coupling the replacement tower to the remaining portion of the tower of the existing wind turbine installation.

17. The method according to claim 14, further comprising inspecting and/or testing the existing wind turbine tower so as to determine how much of the tower of the existing wind turbine installation can be reused with the retrofitted wind turbine installation.

18. The method according to claim 14, further comprising varying at least one physical parameter of the retrofitted wind turbine installation to optimize an amount of the existing tower reused in the retrofitted wind turbine installation, while maintaining a maximum bending moment in the remaining portion of the tower below a predetermined limit.

19. The method according to claim 18, wherein varying the at least one physical parameter includes varying at least one of: i) a height of the cable mounting position of the stay cables to the tower; ii) a diameter of the stay cables; iii) an angle the stay cables makes relative to ground; iv) a distance between the stay cable foundations and the tower; and v) the properties of the stay cables.

20. The method according to claim 14, further comprising forming the stay cable foundations prior to disassembling the at least a portion of the existing wind turbine.

* * * * *